United States Patent
Bottiglieri et al.

(10) Patent No.: US 11,674,065 B2
(45) Date of Patent: Jun. 13, 2023

(54) COMPOSITION INCLUDING A PLURALITY OF ABRASIVE PARTICLES AND METHOD OF USING SAME

(71) Applicant: SAINT-GOBAIN CERAMICS & PLASTICS, INC., Worcester, MA (US)

(72) Inventors: Stephen Bottiglieri, Northbridge, MA (US); James A. Salvatore, Sutton, MA (US); Ian T. Sines, Franklin, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/537,264

(22) Filed: Aug. 9, 2019

(65) Prior Publication Data

US 2020/0048516 A1     Feb. 13, 2020

Related U.S. Application Data

(60) Provisional application No. 62/717,134, filed on Aug. 10, 2018.

(51) Int. Cl.
*C01F 7/02* (2022.01)
*C09K 3/14* (2006.01)
(Continued)

(52) U.S. Cl.
CPC .............. *C09K 3/1409* (2013.01); *C01F 7/02* (2013.01); *C09G 1/02* (2013.01); *C09K 3/1454* (2013.01);
(Continued)

(58) Field of Classification Search
CPC ...... C09K 3/1409; C09K 3/1454; C09K 3/14; C01F 7/02; C01F 7/441; C01F 7/44;
(Continued)

(56) References Cited

U.S. PATENT DOCUMENTS 5,277,702 A * 1/1994 Thibault ................. C01F 7/022
501/153
5,284,809 A   2/1994 Van Dijen
(Continued)

FOREIGN PATENT DOCUMENTS

CA    2137249 A1   12/1993
CN    1434745 A    8/2003
(Continued)

OTHER PUBLICATIONS

Dynys, F.W. and Halloran, J.W. "Alpha Alumina Formation in Alum-Derived Gamma Alumina". Journal of the American Ceramic Society. 1982, 65, 9, pp. 442-448. doi:10.1111/j.1151-2916.1982. tb10511.x (Year: 1982).*

(Continued)

*Primary Examiner* — Kevin E Yoon
*Assistant Examiner* — Marites A Guino-O Uzzle
(74) *Attorney, Agent, or Firm* — Abel Schillinger, LLP; Adrian Lawrence (57) ABSTRACT

A composition having a plurality of abrasive particles including alumina, the plurality of abrasive particles have mesoporosity with an average meso branching index of at least 55 junctions/microns$^2$ and a median particle size (D50) of at least 5 microns.

16 Claims, 2 Drawing Sheets

(51) Int. Cl.
*C09G 1/02* (2006.01)
*C04B 35/64* (2006.01)
*C01F 7/441* (2022.01)

(52) U.S. Cl.
CPC .......... *C01F 7/441* (2013.01); *C01P 2004/54* (2013.01); *C01P 2004/61* (2013.01); *C01P 2006/12* (2013.01); *C01P 2006/14* (2013.01); *C01P 2006/16* (2013.01); *C01P 2006/80* (2013.01); *C04B 35/64* (2013.01)

(58) Field of Classification Search
CPC .............. C01P 2006/16; C01P 2006/14; C01P 2004/61; C01P 2004/54; C01P 2006/80; C01P 2006/12; C09G 1/02; B24C 1/00; B24D 3/20; H01L 21/304; H01L 21/30625; H01L 21/306; B24B 1/00; C04B 35/64
See application file for complete search history.

(56) References Cited

U.S. PATENT DOCUMENTS

| | | | |
|---|---|---|---|
| 6,403,526 | B1 | 6/2002 | Lussier et al. |
| 6,488,767 | B1 | 12/2002 | Xu |
| 6,551,175 | B2 | 4/2003 | Koichi |
| 6,602,439 | B1 | 8/2003 | Hampden-Smith |
| 7,422,730 | B2 | 9/2008 | Wang |
| 10,400,146 | B2 | 9/2019 | Erickson |
| 2003/0185748 | A1 | 10/2003 | Sinha et al. |
| 2004/0197263 | A1 | 10/2004 | Wang |
| 2005/0194358 | A1 | 9/2005 | Chelle |
| 2011/0217552 | A1 | 9/2011 | Schulze-Isfort |
| 2011/0258938 | A1* | 10/2011 | Morinaga ................ B24D 3/00 51/309 |
| 2016/0013066 | A1 | 1/2016 | Noller |
| 2018/0066161 | A1 | 3/2018 | Tsuchiya |

FOREIGN PATENT DOCUMENTS

| | | | | |
|---|---|---|---|---|
| CN | 1771198 | A | | 5/2006 |
| CN | 101831244 | A | | 9/2010 |
| CN | 104114666 | A | | 10/2014 |
| CN | 106698489 | A | * | 5/2017 |
| CN | 106698489 | A | | 5/2017 |
| EP | 279672 | | | 2/1988 |
| EP | 0279672 | A1 | * | 8/1988 ................ C01F 7/32 |
| JP | 63288909 | S | | 11/1988 |
| JP | H07206432 | A | | 8/1995 |
| JP | 2001302235 | A | | 10/2001 |
| JP | 2003517993 | A | | 6/2003 |
| JP | 2006124622 | A1 | | 5/2006 |
| JP | 2016521235 | A | | 7/2016 |
| WO | 0145838 | A1 | | 6/2001 |
| WO | 2013-102174 | A1 | | 7/2013 |

OTHER PUBLICATIONS

CN-106698489-A machine translation (Year: 2017).*
Hudson, L.K., Misra, C., Perrotta, A. J., Wefers, K., and Williams, F.S. "Aluminum Oxide" Section 1.1. Fig. 1. Classification of aluminum hydroxides. Ullmann's Encyclopedia of Industrial Chemistry, doi: 10.1002/14356007.a01_557 (Year: 2000).*
Alumina Calcined Alumina. Polishing (2017) [retrieved at Oct. 19, 2022 from <URL: https://www.almatis.com/market-en/polishing/ and https://www.almatis.com/media/mvreqxzt/gp_007_polishing_ 0422.pdf>] (Year: 2017).*
Examiner Excel Sheet for Thibault at Fig. 4 (Year: 1994).*
International Search Report dated Nov. 29, 2019, with regard to International Application No. PCT/US2019/45999.
Anonymous: "A guidebook to particle size analysis", pp. 1-32, Irvine, CA.

* cited by examiner

COMPOSITION INCLUDING A PLURALITY OF ABRASIVE PARTICLES AND METHOD OF USING SAME

CROSS-REFERENCE TO RELATED APPLICATION

This Application claims priority under 35 U.S.C. § 119(e) to U.S. Provisional Application No. 62/717,134, entitled "COMPOSITION INCLUDING A PLURALITY OF ABRASIVE PARTICLES AND METHOD OF USING SAME," by Stephen BOTTIGLIERI et al., filed Aug. 10, 2018, which is assigned to the current assignee hereof and is incorporated herein by reference in its entirety.

BACKGROUND

Field of the Disclosure

The following is directed to a composition, and more particularly, a dry powder composition and/or slurry including an abrasive particle.

Description of the Related Art

Compositions for use in material removal operations are known. Such abrasive compositions may include fixed abrasive compositions wherein a collection of abrasive particles are attached to a body or substrate. Alternatively, certain abrasive compositions can include free abrasives, wherein the abrasive particles are not attached to a body or substrate, but are contained within a liquid carrier as a slurry or mixture. Depending upon the type of material removal operation, one may choose to use a fixed abrasive or free abrasive.

Conventional abrasive slurries are most often used in polishing of materials (e.g., glass, metal, etc.). The electronic device manufacturing industry uses polishing slurries for chemical mechanical planarization (CMP). In a typical CMP process, a substrate (e.g., a wafer) is placed in contact with a moving polishing pad, for example, a rotating polishing pad attached to a platen. The relative movement of the slurry to the substrate assists with the planarization (polishing) process by chemically and mechanically interacting with the substrate film being planarized due to the effect of the movement of the pad relative to the substrate.

Other industries also demand polishing compositions. For example, the automotive industry uses polishing compositions for a variety of reasons, including finishing of paint and protective coatings. For example, a clear coat is a glossy and transparent coating usually sprayed on top of a colored paint coat of an automotive (e.g., cars, boats, airplanes, etc.). The clear coat can form the final interface with the environment. Accordingly, besides providing a desired gloss to the paint, the clear coat can also provide protection from UV rays that cause the paint on the car to fade and provide protection to the color coat from various forms of harmful chemicals, bird droppings, acid rain, minor scratches, etc. After the clear coat is applied, it is typically polished to provide the desired finish.

In one aspect, disclosed herein is method for conducting a material removal process on a workpiece comprising: moving a plurality of abrasive particles relative to a workpiece, the plurality of abrasive particles comprising alumina and further comprising at least one of: a) an average meso branching index of at least 55 junctions/microns$^2$ and a median particle size (D50) of at least 5 microns; b) a porosity of at least 5 vol % and a half 100 percent distribution value (D100-D0)/D50 of not greater than 7.5; or c) any combination thereof.

In another aspect, disclosed herein is a composition comprising: a plurality of abrasive particles comprising alumina, wherein the plurality of abrasive particles comprise mesoporosity having an average meso branching index of at least 55 junctions/microns$^2$ and a median particle size (D50) of at least 5 microns.

In another aspect, disclosed herein is a composition comprising: a plurality of abrasive particles comprising alumina, wherein the plurality of abrasive particles comprise a porosity of at least 5 vol % and a half 100 percent distribution value (D100-D0)/D50 of not greater than 7.5.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed toward a composition including a plurality of abrasive particles, more particularly a polishing composition. The polishing composition may be used in a variety of applications, including for example, but not limited to, automotive, aerospace, industrial, medical, electrical device manufacturing, packaging and the like.

According to one aspect, the polishing composition can include a particular type of abrasive comprising alumina having certain microstructural features and particle size distribution attributes. In some instances, the starting material to form the abrasive particles comprising alumina may be an aluminum oxide precursor powder. The aluminum oxide precursor powder may be an aluminum hydroxide powder. In some embodiments, the aluminum hydroxide powder may include gibbsite, boehmite, diaspore, or any combination thereof. In some embodiments, the aluminum oxide precursor powder can be an aluminum oxide powder containing a transitional aluminum oxide phase. For example, the aluminum oxide precursor powder can include gamma (γ), eta (η), theta (θ), chi (χ), (kappa) κ, and/or delta (δ) phase aluminum oxide.

The particles of the aluminum oxide precursor powder can comprise a plurality of crystallites having an average primary crystallite size of less than 5 microns. In some embodiments, the particles of the aluminum oxide precursor powder can comprise a plurality of crystallites having an average primary crystallite size within a range of at least 0.01 microns to not greater than 5 microns. The aluminum oxide precursor powder can also have a specific surface area of at least about 100 m$^2$/g and a density of at least about 2 g/cm$^3$.

In order to produce an abrasive particle comprising alumina, the aluminum oxide precursor powder described above can be calcined. When an aluminum oxide precursor powder is calcined, aluminum oxide can be formed. However, aluminum oxide can be in a variety of phases including γ, η, θ, χ, κ, δ, and/or alpha (α) phase. Each phase of aluminum oxide can have a unique crystal structure and properties.

Various devices can be used in the calcination of the aluminum oxide precursor powder including a rotary kiln, a static kiln, a muffle furnace, an elevator kiln, or a pusher kiln, among others. The temperature of the calcination process can be about 700-1600° C., such as about 800-1500° C., about 900-1400° C., about 1000-1300° C., or about 1100-1300° C. The calcination time can be about 1-48 hours, such as about 12-48 hours, about 24-48.

The particles of the calcined powder can comprise a plurality of crystallites having an average primary crystallite size of less than about 5 microns, such as less than about 2 microns or less than about 1 micron or less than about 0.5 microns. In some embodiments, the particles of the calcined powder can comprise a plurality of crystallites having an average primary crystallite size of less than about 0.01-5 microns, about 0.05-2 microns, about 0.075-1 microns, or about 0.1-0.5 microns.

The calcined powder can also have a specific surface area (SSA) of about 1-20 $m^2/g$ and a density of greater than or equal to about 3 $g/cm^3$, such as within a range including at least 3 and not greater than 4 $g/cm^3$.

The calcined powder can also be porous. Specifically, the calcined powder can be mesoporous and macroporous. The mesoporosity and the macroporosity can be quantified by the pore volume and the pore size. For example, at least a portion of the calcined powder can be mesoporous with a pore volume within a range of 0.001-0.5 $cm^3/g$ and a pore size of about 2-50 nm. In addition, at least a portion of the calcined powder can be macroporous with a pore volume of about 0.01-0.2 $cm^3/g$ and a pore size of about 50-500 nm.

After calcining the powder can be milled to achieve a desired particle size distribution. The particle size distribution can be described by a variety of features. Various devices can be used in the milling of the calcined powder including a vertical agitator, a horizontal agitator, a roll mill, a jet mill, or a planetary mill, among others. In addition, the milling can take place in a wet or dry process.

For example, a wet process can include using a vertical agitator that employs a spindle and fine media. The ratio of media:powder in the vertical agitator can be about 2:1, the rpm of the vertical agitator can be about 100-1500 rpm, and surfactants may be used agitator to control zeta potential and dispersion.

Examples of a dry milling process include a roll mill and a jet mill. A roll mill can include media and powder of different loadings. In addition, the RPM of rolling can alter. A jet mill can mill particles using air-impingement impact of particles. In addition, an air-classifier can be employed with the jet mill to control the distribution size of the particles carefully. Furthermore, a planetary mill can be used which relies on rotational impact milling of powders in ceramic containers containing media.

In some embodiments, the milled powder can be used as a plurality of abrasive particles that may be placed in a liquid carrier to form a slurry. The plurality of abrasive particles can be suspended in the liquid carrier. The liquid carrier can be water or other materials.

In one particular aspect, the plurality of abrasive particles in the polishing composition can include a certain content of alumina, which may facilitate improved performance of the composition. For example, the plurality abrasive particles may include at least 60 wt % alumina for a total weight of the plurality of abrasive particles, such as at least 70 wt %, or at least 80 wt %, or at least 90 wt % or at least 95 wt %. In still another embodiment, the plurality of abrasive particles may include not greater than 99 wt % alumina for a total weight of the plurality of abrasive particles. In another embodiment, the plurality of abrasive particles may consist essentially of alumina. It will be appreciated that there may be minor contents of impurities within the plurality of abrasive particles, and the abrasive particles may still be considered to consist essentially of alumina.

In another embodiment, the plurality of abrasive particles may include alpha alumina. In particular instances, the plurality of abrasive particles may include a particular content of alpha alumina that may facilitate improved performance of the composition. For example, the plurality of abrasive particles may include at least 60 wt % alpha alumina for a total weight of the plurality of abrasive particles, such as at least 70 wt %, or at least 80 wt %, or at least 90 wt % or at least 95 wt %. Still, in one non-limiting embodiment, the plurality of abrasive particles can have not greater than 99 wt % alpha alumina for total weight of the plurality abrasive particles. It will be appreciated that the content of alpha alumina in the plurality of abrasive particles may be within range including any of the minimum and maximum values noted above.

In certain instances, the plurality of abrasive particles may include transition alumina. The transition alumina species may include Theta phase, gamma phase, and Delta phase alumina. In at least one aspect, the transition alumina may include a majority content of data phase alumina. More specifically, the transition alumina includes gamma ($\gamma$), $\eta$, theta ($\theta$), chi ($\chi$), (kappa) $\kappa$, and/or delta ($\delta$) phase aluminum oxide. In at least one particular embodiment, the plurality of abrasive particles can include theta phase, gamma phase, and delta phase alumina, and the content of theta phase alumina may be greater than the content of gamma phase or delta phase alumina. Particular embodiments of the abrasive particles may include alpha alumina and transition alumina. More specifically, in at least one embodiment, the plurality of abrasive particles may consist essentially of alpha alumina and transition alumina. Evaluation of the phases present in the abrasive particles is completed via X-ray diffraction data collected using a Rigaku Miniflex II using a scan speed of 2 deg/min operating at 30 kV and 15 mA. Quantification of the content of alpha alumina and transition alumina is performed using Reitveld Refinement software Topas 4.2 from Bruker.

Still, in another embodiment the plurality of abrasive particles may have a particular alumina phase content ratio (Cp) as defined by the equation Cp=Ct/Ca, wherein Ca represents the content (vol %) of alpha alumina in the plurality of abrasive particles and Ct represents the content (vol %) of transition phase. For example, if the abrasive particles included 90 wt % alpha alumina and 10 wt % transition phase alumina, the alumina phase content ratio would be (10%/90%)=0.11. The alumina phase content ratio of the abrasive particles may facilitate improved performance of the composition. In certain instances, the plurality of abrasive particles may have an alumina phase content ratio of 0, wherein there is no content of transition alumina. Still, in other instances, the alumina phase content ratio (cp) can be at least 0.01, such as at least 0.02, or at least 0.03, or at least 0.04, or at least 0.05, or at least 0.06, or at least 0.07, or at least 0.08, or at least 0.09, or at least 0.1, or at least 0.15, or at least 0.2, or at least 0.25, or at least 0.3, or at least 0.35, or at least 0.4, or at least 0.5, or at least 0.6, or at least 0.7, or at least 0.8, or at least 0.9, or at least 1, or at least 2, or at least 3, or at least 4, or at least 5, or at least 6, or at least 7, or at least 8, or at least 9, or at least 10, or at least 20, or at least 30, or at least 40, or at least 50, or at least 60, or at least 70, or at least 80, or at least 90 or at least 100. Still, in one non-limiting embodiment, the alumina phase content ratio of the plurality of abrasive particles may be not greater than 100, such as not greater than 90, or not greater than 80, or not greater than 70, or not greater than 60, or not greater than 50, or not greater than 40, or not greater than 30, or not greater than 20, or not greater than 10, or not greater than 5, or not greater than 1, or not greater than 0.5, or not greater than 0.2, or not greater than 0.1 or not greater than 0.05. It will be appreciated that the alumina phase content ratio may be within a range including any of the minimum and maximum values noted above, including for example within a range including at least 0 to not greater than 100 or within a range of at least 0 to not greater than 50 or within a range of at least 0.01 to not greater than 20 or within a range of at least 0.05 to not greater than 1.

The plurality of abrasive particles may include a certain content of polycrystalline transition alumina, which may facilitate improved performance of the composition. For example, the plurality of abrasive particles may include at least 1 wt % polycrystalline transition alumina for a total weight of the plurality of abrasive particles, such as 2 wt %, or at least 3 wt %, or at least 5 wt %, or at least 7 wt %, or at least 10 wt %, or at least 12 wt %, or at least 15 wt %, or at least 18 wt % or at least 20 wt %. Still, in one non-limiting embodiment, the plurality of abrasive particles can have not greater than 30 wt % polycrystalline transition alumina for a total weight of the plurality of abrasive particles, such as not greater than 25 wt %, or not greater than 22 wt %, or not greater than 20 wt %, or not greater than 18 wt %, or not greater than 15 wt %, or not greater than 12 wt % or not greater than 10 wt %. It will be appreciated that the content of polycrystalline transition alumina may be within a range including any of the minimum and maximum percentages noted above.

In particular instances, the plurality of abrasive particles may consist essentially of alpha alumina, and more specifically, the plurality of abrasive particles may consist essentially of polycrystalline alpha alumina. According to one particular embodiment, the plurality of abrasive particles may include at least 60 wt % polycrystalline alpha alumina for a total weight of the plurality of abrasive particles, such as at least 70 wt %, or at least 80 wt %, or at least 90 wt % or at least 95 wt %. In other embodiments, the plurality of abrasive particles may include not greater than 99 wt % polycrystalline elf alumina for a total weight of the plurality of abrasive particles, such as not greater than 97 wt %, or not greater than 95 wt %, or not greater than 90 wt %, or not greater than 88 wt %, or not greater than 85 wt %, or not greater than 83 wt % or not greater than 80 wt %. It will be appreciated that the polycrystalline alpha alumina content in the plurality of abrasive particles can be within a range including any of the minimum and maximum numbers percentages noted.

The plurality of abrasive particles may have a particular particle size distribution that may facilitate improved performance of the composition. In one aspect, the particle size distribution can be a unimodal or monomodal distribution. As used herein, a distribution is unimodal or monomodal if for some value m, it is monotonically increasing for x≤m and monotonically decreasing for x≥m. In that case, the maximum value of f(x) is f(m) and there are no other local maxima.

The particle size distribution features are measured by laser scattering using a Horiba LA 950. Deionized water is used as circulation bath medium. A refractive index of 1.66 with imaginary value of 0.0i is used. The refractive index for water is 1.333. The sample is prepared by introducing 0.5 g of sample into 30 ml deionized water in a glass beaker. The pH of the water is set to 6.4. The analyzer is prepared for analysis with deionized water of a pH of 6.4 and by rinsing twice with additional deionized water with a pH of 6.4 and then backfilling. Three drops of a 1% solution of Darvan C is added to the sample chamber. The analyzer is aligned and blanked, after which the circulation and agitation are started. The circulation and agitation are kept at 15 and 5, respectively. The sample is introduced into the sample chamber until a transmittance level between 90% and 95% is achieved. The sample is allowed to circulate for 2 minutes before data acquisition.

The data from the analysis is imported into suitable computer software capable of providing statistical analysis. In this case, all data between D0 and D100 are imported into Microsoft Excel. The data analysis functions of Microsoft Excel are then used to analyze the distribution specifics.

In one particular embodiment, the plurality of abrasive particles can have a certain median particle size that may facilitate improved performance of the composition. The median particle size (D50) is the particle size at the 50th percentile of the particle size distribution. For example, the median particle size (D50) of the plurality of abrasive particles can be at least 1 micron, such as at least 2 microns, at least 3 microns, at least 4 microns, at least 5 microns, at least 6 microns, at least 7 microns, or at least 8 microns, or at least 9 microns, or at least 10 microns, or at least 15 microns, or at least 20 microns, or at least 25 microns, or at least 30 microns, or at least 35 microns, or at least 40 microns, or at least 45 microns, or at least 50 microns, or at least 55 microns, or at least 60 microns, or at least 80 microns, or at least 100 microns, or at least 200 microns, or at least 300 microns, or at least 400 microns, or at least 500 microns, or at least 800 microns, or at least 1000 microns, or at least 2000 microns, or at least 3000 microns, or at least 4000 microns or at least 5000 microns. In another non-limiting embodiment, the median particle size (D50) of the plurality of abrasive particles can be not greater than 6000 microns, such as not greater than 5000 microns, or not greater than 4000 microns, or not greater than 3000 microns, or not greater than 2000 microns, or not greater than 1000 microns, or not greater than 800 microns, or not greater than 500 microns, or not greater than 200 microns, or not greater than 100 microns, or not greater than 80 microns, or not greater than 70 microns, or not greater than 60 microns or not greater than 50 microns. It will be appreciated that the median particle size can be within range including any of the minimum and maximum values noted above including, for example within range including at least 3 microns and not greater than 200 microns or within a range including at least 5 microns and not greater than 100 microns or within a range including at least 5 microns and not greater than 50 microns.

In some instances, the plurality of abrasive particles can have a 100 percent distribution value (D100-D0) they may facilitate improved performance of the composition. The 100 percent distribution value can define the full range of particle sizes (microns) of the distribution. For example, the plurality of abrasive particles may have a 100 percent distribution value of at least 20 microns, such as at least 25 microns or at least 30 microns or at least 35 microns or at least 40 microns, or at least 45 microns, or at least 50 microns, or at least 55 microns, or at least 60 microns, or at least 80 microns, or at least 100 microns, or at least 120 microns, or at least 150 microns, or at least 180 microns, or at least 200 microns, or at least 300 microns, or at least 500 microns, or at least 800 microns, or at least 1000 microns, or at least 2000 microns, or at least 3000 microns, or at least 4000 microns or at least 5000 microns. Still, in another non-limiting embodiment, the 100 percent distribution value may be not greater than 20,000 microns, such as not greater than 15,000 microns, or not greater than 10,000 microns, or not greater than 5000 microns, or not greater than 2000 microns, or not greater than 1000 microns, or not greater than 800 microns, or not greater than 500 microns, or not greater than 200 microns, or not greater than 180 microns, or not greater than 150 microns, or not greater than 120 microns, or not greater than 100 microns or not greater than 80 microns. It will be appreciated that the 100 percent distribution value can be within a range including any of the minimum and maximum values provided above, including for example within a range including at least 20 microns and not greater than 1000 microns or within a range including at least 20 microns and not greater than 500 microns or within a range including at least 20 microns and not greater than 200 microns.

In still another embodiment, the plurality of abrasive particles may have a particle size distribution having a particular 80 percent distribution value (D90-D10) that may facilitate improved performance of the composition. D90 is understood to be the particle size value of the abrasive particles at the 90th percentile of the particle size distribution. That is, D90 describes the value for which 89% of the particles in the distribution have a small particle size. D10 is understood to be the particle size value of the abrasive particles at the 10th percentile of the particle size distribution. That is, D10 describes the value for which 89% of the particles in the distribution have a greater particle size. For example, the plurality of abrasive particles can have a 80 percent distribution value of at least 6 microns, such as at least 7 microns, at least 8 microns, at least 9 microns, or at least 10 microns, or at least 15 microns, or at least 20 microns, or at least 25 microns, or at least 30 microns, or at least 35 microns, or at least 40 microns, or at least 45 microns, or at least 50 microns, or at least 55 microns, or at least 60 microns, or at least 80 microns, or at least 100 microns, or at least 200 microns, or at least 300 microns, or at least 400 microns, or at least 500 microns, or at least 800 microns, or at least 1000 microns, or at least 2000 microns, or at least 3000 microns, or at least 4000 microns, or at least 5000 microns, or at least 6000 microns or at least 7000 microns. In another non-limiting embodiment, the 80 percent distribution value may be not greater than 8000 microns, such as not greater than 7000 microns, or not greater than 6000 microns, or not greater than 5000 microns, or not greater than 4000 microns, or not greater than 3000 microns, or not greater than 2000 microns, or not greater than 1000 microns, or not greater than 800 microns, or not greater than 500 microns, or not greater than 200 microns, or not greater than 100 microns, or not greater than 80 microns, or not greater than 70 microns, or not greater than 60 microns or not greater than 50 microns. In will be appreciated that the 80 percent distribution value can be within range including any of the minimum and maximum values noted above, including for example within range including at least 8 microns and not greater than 800 microns or within a range including at least 8 microns and not greater than 200 microns or within a range including at least 8 microns and not greater than 100 microns.

The plurality of abrasive particles may have a half 80 percent distribution value ((D90-D10)/D50) that can facilitate improved performance of the composition. For example the particle size distribution of the plurality of abrasive particles may have a half 80% distribution value of at least 0.00025, such as at least 0.0005, or at least 0.001, or at least 0.005, or at least 0.008, or at least 0.01, or at least 0.05, or at least 0.08, or at least 0.1, or at least 0.2, or at least 0.3, or at least 0.5, or at least 0.8, or at least 1, or at least 2, or at least 3, or at least 4, or at least 5, or at least 6, or at least 7, or at least 8, or at least 9, or at least 10, or at least 11, or at least 20, or at least 50, or at least 100, or at least 200, or at least 400, or at least 600 or at least 800 or at least 1000. Still, in a non-limiting embodiment, the plurality of abrasive particles can have a half 80 percent distribution value of not greater than 1500, such as not greater than 1000, or not greater than 800, or not greater than 600, or not greater than 400, or not greater than 200, or not greater than 100, or not greater than 80, or not greater than 50, or not greater than 20, or not greater than 10, or not greater than 8, or not greater than 6, or not greater than 4, or not greater than 2, or not greater than 1.5, or not greater than 1, or not greater than 0.5, or not greater than 0.1, or not greater than 0.05, or not greater than 0.01, or not greater than 0.005 or not greater than 0.001. It will be appreciated that the half 80 percent distribution value can be within a range including any of the minimum and maximum values noted above, including for example, within a range including at least 0.0025 and not greater than 1000 or within a range including at least 0.1 and not greater than 100 microns or within a range including at least 0.5 and not greater than 2.

In other instances, the plurality of abrasive particles can have a particle size distribution with a particular half 100 percent distribution value ((D100-D0)/D50) that may facilitate improved performance of the composition. For example, the half 100 percent distribution value ((D100-D0)/D50) can be at least 0.001, such as at least 0.005, or at least 0.01, or at least 0.05, or at least 0.1, or at least 0.5, or at least 0.8, or at least 1, or at least 2, or at least 4, or at least 6 or at least 8, or at least 10, or at least 15, or at least 20, or at least 25, or at least 30, or at least 35, or at least 20, or at least 100, or at least 200, or at least 400, or at least 600, or at least 800, or at least 1000, or at least 2000 or at least 3000. In other instances, the half 100 percent distribution value may be not greater than 3500, such as not greater than 3000, or not greater than 2000, or not greater than 1000, or not greater than 800, or not greater than 500, or not greater than 200, or not greater than 100, or not greater than 80, or not greater than 50, or not greater than 40, or not greater than 30, or not greater than 20, or not greater than 10, or not greater than 5, or not greater than 1, or not greater than 0.5, or not greater than 0.1, or not greater than 0.05 or not greater than 0.01. It will be appreciated that the half 100 percent distribution value can be within a range including any of the minimum and maximum values noted above, including for example, within range including at least 0.001 and not greater than 1000 or within a range including at least 0.1 and not greater than 100 microns or within a range including at least 0.1 and not greater than 50. In a particular embodiment, the half 100 percent distribution value can be at least 1 and not greater than 7.5.

In certain instances, the plurality of abrasive particles can have a particle size distribution with a particular mean particle size that may facilitate improved performance of the composition. As used herein, the mean is the arithmetic mean or average. For example, the plurality of abrasive particles may have a mean particle size at least 6 microns, such at least 7 microns, or at least 8 microns, or at least 9 microns, or at least 10 microns, or at least 15 microns, or at least 20 microns, or at least 25 microns, or at least 30 microns, or at least 35 microns, or at least 40 microns, or at least 45 microns, or at least 50 microns, or at least 55 microns, or at least 60 microns, or at least 80 microns, or at least 100 microns, or at least 200 microns, or at least 300 microns, or at least 400 microns, or at least 500 microns, or at least 800 microns, or at least 1000 microns, or at least 2000 microns, or at least 3000 microns, or at least 4000 microns or at least 5000 microns. In still another embodiment, the plurality of abrasive particles may have a mean particle size of not greater than 6000 microns, such as not greater than 5000 microns, or not greater than 4000 microns, or not greater than 3000 microns, or not greater than 2000 microns, or not greater than 1000 microns, or not greater than 800 microns, or not greater than 500 microns, or not greater than 200 microns, or not greater than 100 microns, or not greater than 80 microns, or not greater than 70 microns, or not greater than 60 microns or not greater than 50 microns. Still it will be appreciated that the plurality of abrasive particles may have a mean particle size within a range including any of the minimum and maximum values noted above, including but not limited to, within a range including at least 6 microns and not greater than 100 microns or within a range including at least 6 microns and not greater than 50 microns or within a range including at least 6 microns and not greater than 15 microns.

In another embodiment, the particle size distribution may have a particular skewness that may facilitate improved performance of the composition. For example, the plurality of abrasive particles may have skewness of at least 1, such as at least 1.5, or at least 2, or at least 2.3, or at least 2.5, or at least 2.8, or at least 3, or at least 4, or at least 5, or at least 6, or at least 7, or at least 8, or at least 9, or at least 10, or at least 11, or at least 12, or at least 13, or at least 14 or at least 15. Still, in another non-limiting embodiment, the plurality of abrasive particles may have a skewness of not greater than 20, such as not greater than 19, or not greater than 18, or not greater than 17, or not greater than 16, or not greater than 15, or not greater than 14, or not greater than 13, or not greater than 12, or not greater than 11, or not greater than 10, or not greater than 9, or not greater than 8, or not greater than 7, or not greater than 6, or not greater than 5, or not greater than 4, or not greater than 3 or not greater than 2. It will be appreciated that the plurality of abrasive particles may have a skewness with in a range including any of the minimum and maximum values above, including for example, within a range of at least 1 to not greater than 20 or within a range of at least 2 to not greater than 12 or within a range of at least 2.3 to not greater than 5. As used herein skewness is a measure of the asymmetry of the probability distribution of a real-valued random variable about its mean. The skewness values herein are reported only as positive values for ease of reference. However, it will be appreciated that the skewness values can have either a positive or negative value, depending on the asymmetry from the mean.

In another embodiment, the particle size distribution may have a particular kurtosis that may facilitate the improved performance of the composition. For example, the plurality of abrasive particles may have a kurtosis of greater than 0, such as at least 1, or at least 2, or at least 3, or at least 4, or at least 5, or at least 6, or at least 7, or at least 8, or at least 9, or at least 10, or at least 15, or at least 20, or at least 25, or at least 30, or at least 35, or at least 40, or at least 45, or at least 50, or at least 55, or at least 60, or at least 65, or at least 70, or at least 75, or at least 80, or at least 85 or at least 90. Still, in another non-limiting embodiment, the plurality of abrasive particles may have a kurtosis of not greater than 100, such as or not greater than 90, or not greater than 80, or not greater than 70, or not greater than 60, or not greater than 50, or not greater than 40, or not greater than 30, or not greater than 20, or not greater than 15, or not greater than 12, or not greater than 10, or not greater than 9, or not greater than 8, or not greater than 7, or not greater than 6, or not greater than 5, or not greater than 4 or not greater than 3. It will be appreciated that the particle size distribution may have a kurtosis within a range including any of the minimum and maximum values noted above, including for example, within a range of at least 1 to not greater than 100 or within a range of at least 2 to not greater than 20 or within a range of at least 4.5 to not greater than 10. Kurtosis is a descriptor of the shape of a probability distribution and is measured herein using the "kurtosis" function in Microsoft Excel.

In yet a further embodiment, the particle size distribution of the plurality of particles abrasive particles of the present disclosure can have a variance not greater than 20, such as not greater than 15, or not greater as 10, or not greater as 8, or not greater as 7 or not greater as 6. In another aspect, the particle size distribution can have a variance of at least 3 or at least 4 or at least 5. The variance of the particle size distribution can be a value including any of the minimum and maximum values noted above. In a particular embodiment, the particle size distribution can have a variance of at least 4 and not greater than 15. The variance, as used herein, is defined as the average of the squared differences from the mean, and can be calculated by a standard Excel function.

In certain instances, the plurality of abrasive particles may be relatively porous compared to certain other abrasive particles. For example, the plurality of abrasive particles may have a certain porosity that may facilitate improved performance of the composition. In certain instances, the plurality of abrasive particles may have a porosity of at least 5 vol %, such as at least 8 vol %, or at least 10 vol %, or at least 12 vol %, or at least 15 vol %, or at least 18 vol %, or at least 20 vol %, or at least 22 vol %, or at least 25 vol %, or at least 27 vol %, or at least 30 vol %, or at least 32 vol %, or at least 35 vol %, or at least 38 vol %, or at least 40 vol %, or at least 42 vol %, or at least 45 vol %, or at least 47 vol %, or at least 50 vol %, or at least 55 vol %, or at least 60 vol %, or at least 65 vol %, or at least 70 vol %, or at least 75 vol % or at least 80 vol %. Still, in another non-limiting embodiment, the plurality of abrasive particles may have a porosity of not greater than 80 vol % for a total volume of the plurality of abrasive particles or not greater than 75 vol %, or not greater than 70 vol %, or not greater than 65 vol %, or not greater than 60 vol %, or not greater than 55 vol %, or not greater than 50 vol %, or not greater than 45 vol %, or not greater than 40 vol %, or not greater than 35 vol %, or not greater than 30 vol %, or not greater than 25 vol %, or not greater than 20 vol % or not greater than 15 vol %. Still, it will be appreciated that the plurality of abrasive particles may have a porosity within a range including any of the minimum and maximum percentages noted above. In a particular embodiment, the porosity can be at least 40 vol % and not greater than 55 vol %.

The plurality of the abrasive particles may have a certain morphology associated with the porosity. In more particular instances, the abrasive particles may have a content of very fine pores defined as mesoporosity that has a certain size and shape. In at least one embodiment, the plurality of abrasive particles can have mesoporosity having an average meso branching index of at least 20 junctions/microns$^2$, such as at least 25 junctions/microns$^2$, or at least 30 junctions/microns$^2$, or at least 35 junctions/microns$^2$, or at least 40 junctions/microns$^2$, or at least 45 junctions/microns$^2$, or at least 50 junctions/microns$^2$, or at least 55 junctions/microns$^2$, or at least 60 junctions/microns$^2$, or at least 65 junctions/microns$^2$, or at least 70 junctions/microns$^2$, or at least 75 junctions/microns$^2$, or at least 80 junctions/microns$^2$, or at least 85 junctions/microns$^2$ or at least 90 junctions/microns$^2$. Still, in another non-limiting embodiment, the average meso branching index may be not greater than 150 junctions/microns$^2$, or not greater than 140 junctions/microns$^2$, or not greater than 130 junctions/microns$^2$, or not greater than 120 junctions/microns$^2$, or not greater than 110 junctions/microns$^2$, or not greater than 100 junctions/microns$^2$, or no greater than 90 junctions/microns$^2$, or not greater than 80 junctions/microns$^2$ or not greater than 70 junctions/microns$^2$. In a particular embodiment, the average meso branching index can be at least 55 junctions/microns$^2$ and not greater than 80 junctions/microns$^2$. It will be appreciated that the average meso branching index may be within a range including any of the minimum and maximum values noted above.

The mesoporosity and meso branching index is evaluated as follows. One or more samples of abrasive particles are prepared for evaluation with a scanning electron microscope. Sample preparations are completed using a Buehler AutoMet 300. The samples are potted in 1.25 in. cups using a two part epoxy. The initial grinding steps are done with metal bonded diamond discs. The polishing steps are done by using diamond pastes along with various polishing cloths. Polished cross-sections are coated with 10 nm thick layer of chromium using a Quorum Q150T ES.

Figure 1:
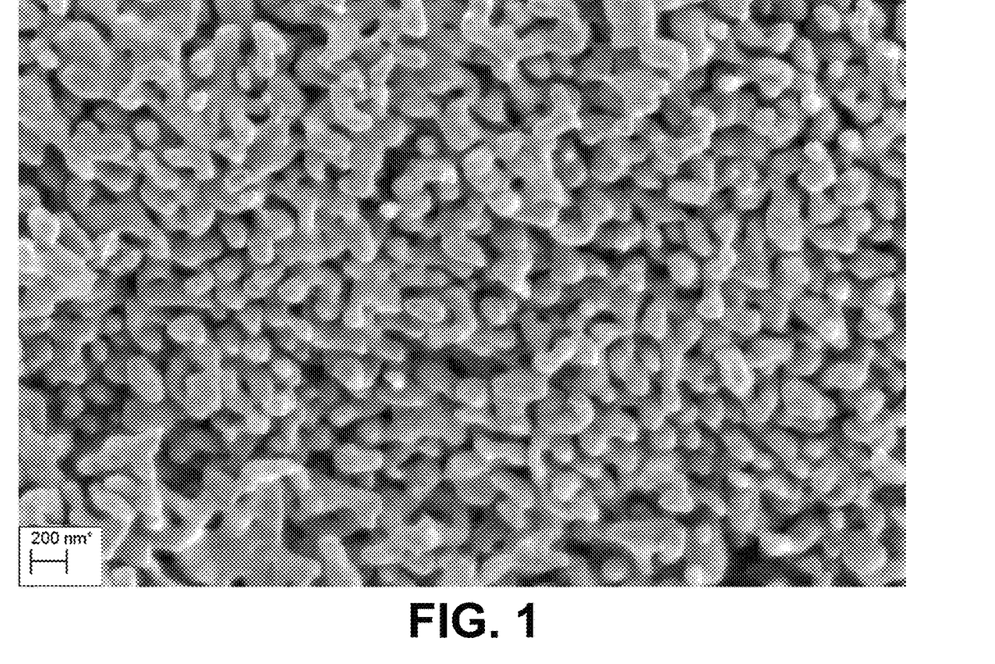
FIGS. 1-4 include images of a portion of an abrasive particle according to an embodiment at different stages of image analysis.
Figure 2:
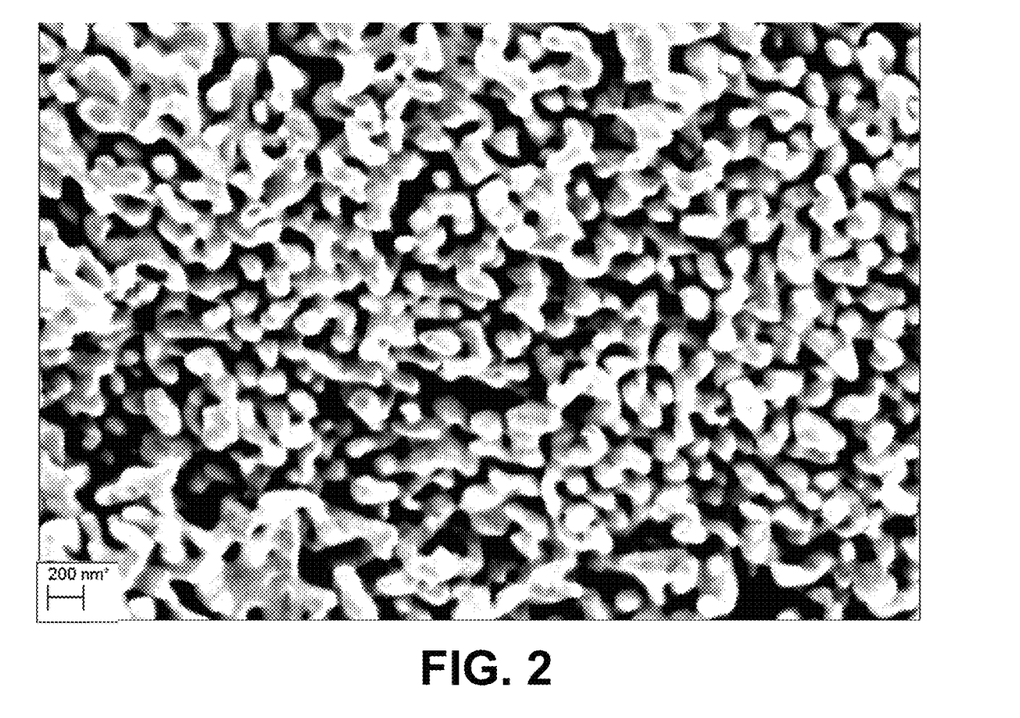

Imaging is performed on a Zeiss Merlin scanning electron microscope operating at 10 kV, current of 200 Pico amps, utilizing a 50:50 mixture of signal from in-lense and secondary electron detector. Images acquired using a 5 micron image width. FIG. 1 includes a representative image of the abrasive particles of the embodiments herein. A plurality of images from randomly selected particles may be used to develop a statistically relevant data set.

The images are evaluated using imaging analysis software, such as ImageJ having an analyze skeleton function, which is available at: http://imagejdocu.tudor.lu/doku.php?id=plugin:analysis:analyzeskeleton:start Imaging processing steps include: a) opening the image in ImageJ; b) selecting "unsharp mask" function from the "process" and "filter" menus. The "unsharp mask" function is completed with a radius of 1.0 pixel and a mask weight of 0.60. The next step in processing the image includes a "enhance local contrast (CLAHE)" function from the process menu. The enhance local contrast function is completed using the criteria of a blocksize of 127, histogram bins at 256, maximum slope of 3.0, and no mask. The next step includes selecting the "median" function from the "process" and "filters" menu. The "median" function is evaluated with a radius of 2.0 pixels.

Figure 3:
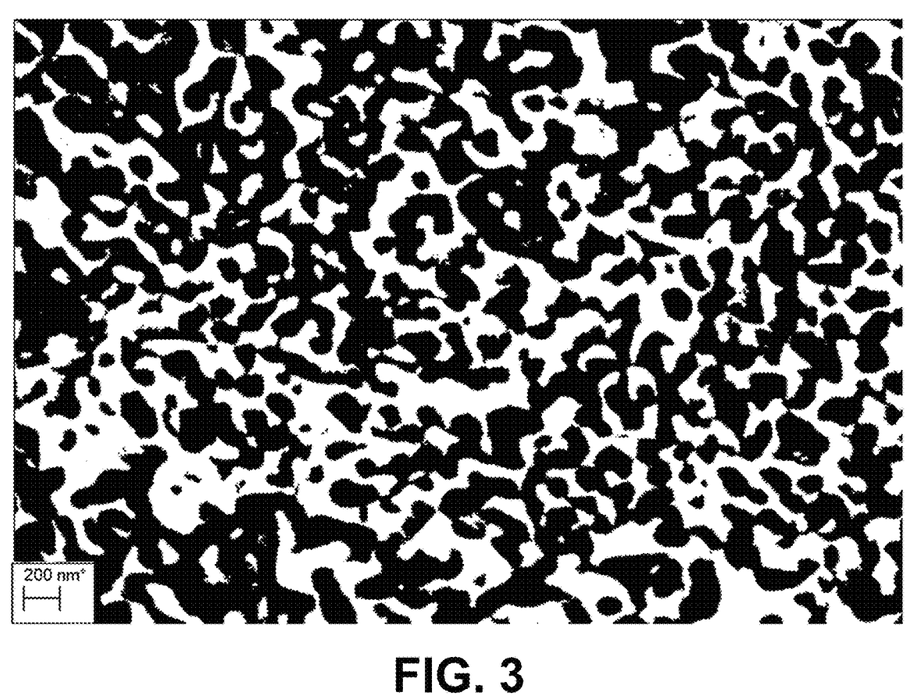

After conducting the "median" function, the image is processed according to the "make binary" function in the "process" and "binary" menus. FIG. 3 is a representative image of a portion of an abrasive particle after using the "make binary" function.

Figure 4:
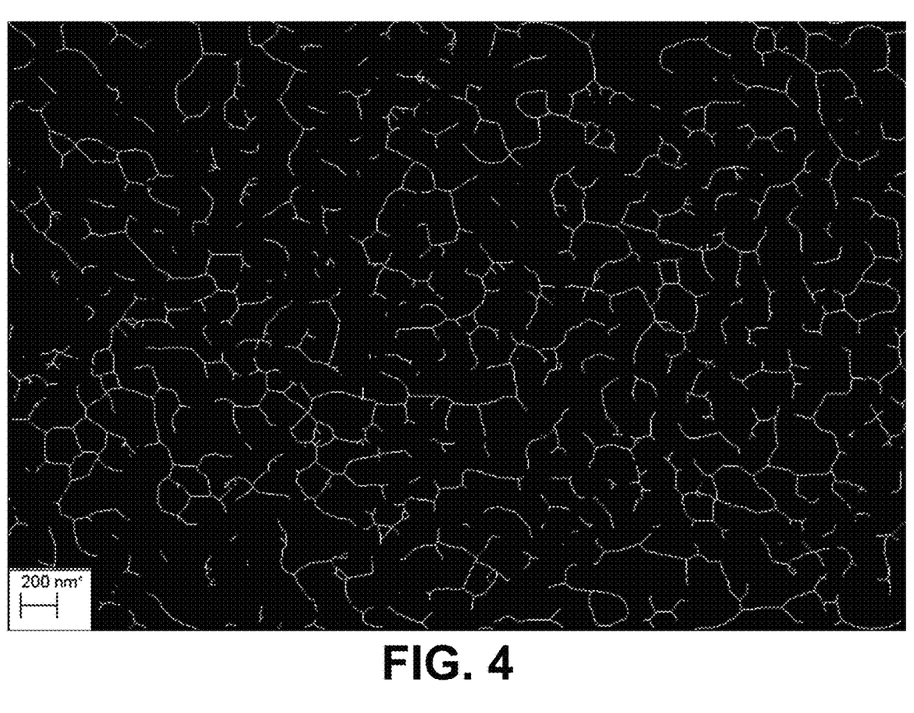

After conducting the "make binary" function, the image is processed according to the "despeckle" function in the "process" and "noise" menus. After the image is despeckled, it is processed according to the "skeletonize" function in the "process" and "binary" menus. FIG. 4 is a representative image of a portion of an abrasive particle after using the "skeletonize" function.

After conducting the "skeletonize" function, the image is processed according to the "analyze skeleton" function in the "analyze" and "skeleton" menus. Select the 'shortest branch' within the prune cycle drop down menu. Check the 'prune ends' toggle box.

The prune cycle method analysis will provide data suitable to evaluate the branching index. After the "analyze skeleton" function has been completed, the total number of junctions is calculated by summing the "# junctions" column. To calculate the meso-branching index, divide the total number of junctions by the area of the micrograph image. This results in junctions per µm$^2$.

In another embodiment, the plurality of abrasive particles may have mesoporosity that creates a certain content of very fine pores and may facilitate improved performance of the composition. For example, the plurality of the abrasive particles can have an average pore size of at least 0.001, microns or at least 0.01 microns, or at least 0.1 microns, or least 1 micron or at least 10 microns. Still, in another non-limiting embodiment, the plurality of abrasive particles may have an average pore size of not greater than 10 microns, such as not greater than 9 microns, or not greater than 8 microns, or not greater than 7 microns, or not greater than 6 microns, or not greater than 5 microns, or not greater than 4 microns, or not greater than 3 micron, or not greater than 2 microns, or not greater than 1 micron, or not greater than 0.1 microns or not greater than 0.01 microns. It will be appreciated that the plurality of abrasive particles can have an average pore size within range including any of the minimum and maximum values noted above.

The average pore size is evaluated by using a Micromeritics Autopore IV System. The percentage of porosity of the abrasive particles is taken from on pore distribution data below 5 microns to ensure that the porosity measured is inherent to the internal abrasive structure and not that between the abrasives. Average pore size ranges are determined from log differential intrusion versus pore size diameter.

The plurality of abrasive particles may have a particular surface area that may facilitate improved performance of the composition. For example, the plurality of abrasive particles may have an average surface area of at least 1 m$^2$/g, such as at least 2 m$^2$/g, or at least 4 m$^2$/g, or at least 6 m$^2$/g, or at least 8 m$^2$/g, or at least 10 m$^2$/g, or at least 12 m$^2$/g, or at least 15 m$^2$/g, or at least 18 m$^2$/g, or at least 20 m$^2$/g, or at least 22 m$^2$/g, or at least 25 m$^2$/g or at least 28 m$^2$/g. Still, in another non-limiting embodiment, the average surface area of the plurality of abrasive particles may be not greater than 30 m$^2$/g, such as not greater than 28 m$^2$/g, or not greater than 26 m$^2$/g, or not greater than 24 m$^2$/g, or not greater than 22 m$^2$/g, or not greater than 20 m$^2$/g, or not greater than 18 m$^2$/g, or not greater than 16 m$^2$/g, or not greater than 14 m$^2$/g, or not greater than 12 m$^2$/g or not greater than 10 m$^2$/g. It will be appreciated that the average surface area may be within range including any of the minimum and maximum values noted above, including for example, within a range including at least 1 m$^2$/g and not greater than 30 m$^2$/g, such as within a range including at least 2 m$^2$/g and not greater than 20 m$^2$/g or within a range including at least 4 m$^2$/g and not greater than 10 m$^2$/g. Surface area measurements are measured on a Micromeritics Tristar II Plus using the Nitrogen BET method.

The composition may include other components besides the abrasive the plurality of abrasive particles. For example, in certain instances the composition may include at least one of a surfactant, dispersant, wetting agent, thickener, defoamer, antimicrobial agent, suspension aid, stabilizer, lubricant, rheological modifier, or any combination thereof. For example, certain optional additives can include oxidizers, dispersants, surfactants, lubricants, or any combination thereof. Some suitable examples of oxidizers can include peroxides (e.g., $H_2O_2$), persulfides (e.g., $H_2S_2$), perchlorates (e.g., $KClO_4$), periodates (e.g., $KIO_4$), perbromates (e.g., $KBrO_4$), permanganates (e.g., $KMnO_4$), chromates (e.g., $K_3CrO_8$), ceric ammonium nitrates (e.g., $(NH_4)_2Ce(NO_3)_6$), ferrocyanides (e.g., $K_4Fe(CN)_6$) or any combination thereof.

Some suitable examples of dispersants include sodium hexametaphosphate, polyvinylpyrrolidone, sodium polynaphthalene sulfonate, sodium polymethacrylate, ammonium polymethacrylate, sodium polyacrylate, ammonium polyacrylate, sodium lignosulfonate. Some suitable examples of surfactants can include oleic acid, cetyltrimethylammonium bromide, dodecanthiol, oleylamine, sodium dodecyl sulfate, hydroxyl phosphono-acetic acid or any combination thereof. Some suitable examples of lubricants can include fluorosurfactants, zinc stearate, manganese dioxide, molybdenum disulfide, aluminosilicates, organosilicone copolymers or any combination thereof.

Furthermore, in certain other instances the composition may be a dry or wet composition. A wet composition may use a liquid phase carrier that facilitates dispersion of the plurality of abrasive particles in the carrier. That is, the plurality of abrasive particles may be suspended in the liquid carrier to form a slurry. After forming the dry powder composition, it may be shipped to a customer, and the customer may add a liquid carrier to create a polishing composition in the form of a slurry. However, in other instances, the dry powder composition can be dispersed within a liquid carrier prior to being sent to a customer. Some suitable examples of liquid carriers can include polar or non-polar liquid materials. In one embodiment, the carrier can include water, and may consist essentially of water, and more particularly, may consist essentially of deionized water.

The compositions of the embodiments can be used in various industries, and particularly, in the automotive industry. For example, the composition may be used to on clear coats and/or hardcoats for various automotives (e.g., cars, boats, airplanes, etc.). More specifically, these abrasive polishes can be used in a coarse removal step to level the clear coat or hardcoat of the automotive and/or in a second finishing step to obtain a high finish.

In certain instances, the plurality of abrasive particles can include less than 1 wt % of certain species, including for example, but not limited to, silica, zirconia, silicon carbide, diamond, cubic boron nitride, boron carbide, ceria, titania, yttria, rare earth oxides, aluminosilicates, transition metal oxides, or any combination thereof. For one particular embodiment, the abrasive particles can be free of silica, zirconia, silicon carbide, diamond, cubic boron nitride, boron carbide, ceria, titania, yttria, rare earth oxides, aluminosilicates, transition metal oxides, or any combination thereof.

In another non-limiting embodiment, the plurality of abrasive particles may have a certain density that may facilitate improved performance of the composition. For example, the density may be at least 2.5 g/cm$^3$ or at least 2.46 g/cm$^3$ or at least 2.7 g/cm$^3$. Still in one non-limiting embodiment, the abrasive particles can have a density of not greater than 5.0 g/cm$^3$, such as not greater than 4.8 g/cm$^3$ or not greater than 4.5 g/cm$^3$ or not greater than 4.0 g/cm$^3$. It will be appreciated that the density of the abrasive particles can be within range including any of the minimum and maximum values noted above, including for example a density of at least 2.3 g/cm$^3$ and not greater than 5.0 g/cm$^3$. The density was measured using a Micromeritics Accupyc II 1340 using He atmosphere.

In one aspect, a dry powder composition can have a particular content of the abrasive particles that may facilitate improved material removal operations. For example, the abrasive particles may be present in an amount of at least 50 wt % of the total weight of the dry powder composition, such as at least 60 wt %, or at least 70 wt %, or at least 80 wt %, or at least 90 wt %, or at least 92 wt %, or at least 94 wt %, or at least 95 wt % or at least 96 wt %. Still, in one non-limiting embodiment, the abrasive particles may be present in an amount of not greater than 99.9 wt % of the total weight of the dry composition, such as not greater than 99 wt %, or not greater than 98 wt %, or not greater than 97 wt %, or not greater than 96 wt %, or not greater than 95 wt %, or not greater than 94 wt %, or not greater than 93 wt %, or not greater than 92 wt %, or not greater than 91 wt %, or not greater than 90 wt % or not greater than 85 wt %. It will be appreciated that the abrasive particles can be present in an amount within a range including any of the minimum and maximum percentages noted above, including for example, within a range of at least 50 wt % and not greater than 99.9 wt %. As noted above, the composition may include certain additives that may also be present in the dry composition. In accordance with another embodiment, the dry powder composition may be free of any additives such as an oxidizer, dispersant, surfactant, lubricant, or any comminution thereof.

As noted herein, the composition may be a wet composition including a liquid carrier. In certain instances, the liquid carrier can be present in amount of at least 45 wt % for a total weight of the composition including the carrier, abrasive particles, and any additives. In other instances, the content of the liquid carrier can be greater, such as at least 50 wt %, such as at least 55 wt %, or 60 wt %, or at least 65 wt %, or at least 70 wt %, or at least 75 wt %, or at least 80 wt % for a total weight of the composition. Still in another non-limiting embodiment, the liquid carrier can be present in amount of not greater than 97 wt % for total weight of the composition, such as not greater than 95 wt %, or not greater than 90 wt %, or not greater than 85 wt %, or not greater than 80 wt %, or not greater than 75 wt % or not greater than 70 wt %. It will be appreciated that the content of the liquid carrier can be within range including any of the minimum and maximum percentages noted above.

The composition may include a particular content of the abrasive particles to facilitate suitable formation of the wet composition. For example, the abrasive particles can be present in amount of at least 2 wt % for a total weight of the composition including the liquid carrier, abrasive particles, and any additives. In other instances, the content of the abrasive particles can be greater, such as at least 5 wt %, such as at least 10 wt %, or 15 wt %, or at least 20 wt %, or at least 25 wt %, or at least 30 wt % or at least 35 wt % for a total weight of the composition. Still in another non-limiting embodiment, the abrasive particles can be present in amount of not greater than 80 wt % for total weight of the composition, such as not greater than 60 wt %, or not greater than 50 wt %, or not greater than 40 wt %, or not greater than 30 wt %, or not greater than 25 wt % or not greater than 20 wt %. It will be appreciated that the content of the abrasive particles can be within range including any of the minimum and maximum percentages noted above.

The one or more optional additives may be present in a particular content in the composition, including for example, least 0.1 wt % of the total additives for the total content of the composition (wet or dry), such as at least 0.5 wt %, or at least 1 wt %, or at least 2 wt %, or at least 3 wt %, or at least 4 wt %, or at least 5 wt %, or at least 6 wt %, or at least 7 wt %, or at least 8 wt % or at least 9 wt %. Still, in one non-limiting embodiment, the total amount of additives in the composition can be not greater than 30 wt % for the total weight of the composition, such as not greater than 25 wt %, or not greater than 20 wt %, or not greater than 15 wt %, or not greater than 12 wt %, or not greater than 10 wt %, or not greater than 8 wt %, or not greater than 6 wt %, or not greater than 4 wt %, or not greater than 3 wt %, or not greater than 2 wt %, or not greater than 1 wt %, or not greater than 0.8 wt %, or not greater than 0.5 wt % or not greater than 0.2 wt %. It will be appreciated that the content of the additives can be within range including any of the minimum and maximum percentages noted above.

For those embodiments employing a wet composition, the pH may be controlled to facilitate improved performance of the composition. For example, the composition may have an acidic or basic pH. In certain instances, the pH can be at least 4, such as at least 5, or at least 6, or at least 7, or at least 8 or at least 9. Still in other embodiments, the pH of the composition may be not greater than 12, such as not greater than 11 or not greater than 10 or not greater than 9. It will be appreciated the pH of the composition may be within range including any of the minimum and maximum values noted above, including for example, a pH within range of at least 4 and not greater than 12.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A composition comprising:
a plurality of abrasive particles comprising alumina, wherein the plurality of abrasive particles comprise mesoporosity having an average meso branching index of at least 20 junctions/microns$^2$ and a median particle size (D50) of at least 5 microns.

Embodiment 2

A composition comprising:
a plurality of abrasive particles comprising alumina, wherein the plurality of abrasive particles comprise a porosity of at least 5 vol % and a half 100 percent distribution value (D100-D0)/D50 of not greater than 7.5.

Embodiment 3

The composition of any one of Embodiments 1 and 2, wherein the plurality of abrasive particles include at least 60 wt % alumina for a total weight of the plurality of abrasive particles or at least 70 wt %, or at least 80 wt %, or at least 90 wt % or at least 95 wt %.

Embodiment 4

The composition of any one of Embodiments 1 and 2, wherein the plurality of abrasive particles consists essentially of alumina.

Embodiment 5

The composition of any one of Embodiments 1 and 2, wherein the plurality of abrasive particles include at least 60 wt % alpha alumina for a total weight of the plurality of abrasive particles or at least 70 wt %, or at least 80 wt %, or at least 90 wt % or at least 95 wt %.

Embodiment 6

The composition of any one of Embodiments 1 and 2, wherein the plurality of abrasive particles includes transition alumina.

Embodiment 7

The composition of Embodiment 6, wherein the transition alumina comprises at least one phase selected from the group consisting of theta, gamma and delta.

Embodiment 8

The composition of Embodiment 7, wherein the transition alumina comprises a majority content of theta.

Embodiment 9

The composition of Embodiment 7, wherein the transition alumina comprises theta phase alumina, gamma phase alumina and delta phase alumina, and wherein the content of theta phase alumina is greater than the content of gamma phase alumina or delta phase alumina.

Embodiment 10

The composition of any one of Embodiments 1 and 2, wherein the plurality of abrasive particles includes alpha alumina and transition alumina.

Embodiment 11

The composition of Embodiment 10, wherein the plurality of abrasive particles consist essentially of alpha alumina and transition alumina.

Embodiment 12

The composition of Embodiment 10, wherein the plurality of abrasive particles comprise an alumina phase content ratio (Cp) of at least 0.1 as defined by the equation $Cp=Ct/Cp$, wherein Ca represents the content (vol %) of alpha alumina in the plurality of abrasive particles and Ct represents the content (vol %) of transition phase alumina in the plurality of abrasive particles, wherein the alumina phase content ratio (Cp) at least 0.01, or at least 0.02, or at least 0.03, or at least 0.04, or at least 0.05, or at least 0.06, or at least 0.07, or at least 0.08, or at least 0.09, or at least 0.1, or at least 0.15, or at least 0.2, or at least 0.25, or at least 0.3, or at least 0.35, or at least 0.4, or at least 0.5, or at least 0.6, or at least 0.7, or at least 0.8, or at least 0.9, or at least 1, or at least 2, or at least 3, or at least 4, or at least 5, or at least 6, or at least 7, or at least 8, or at least 9, or at least 10, or at least 20, or at least 30, or at least 40, or at least 50, or at least 60, or at least 70, or at least 80, or at least 90 or at least 100.

Embodiment 13

The composition of Embodiment 12, wherein the alumina phase content ratio (Cp) is not greater than 100, or not greater than 90, or not greater than 80, or not greater than 70, or not greater than 60, or not greater than 50, or not greater than 40, or not greater than 30, or not greater than 20, or not greater than 10, or not greater than 5, or not greater than 1, or not greater than 0.5, or not greater than 0.2, or not greater than 0.1 or not greater than 0.05.

Embodiment 14

The composition of Embodiment 12, wherein the alumina phase content ratio (Cp) is within a range including at least 0.1 to not greater than 10 or within a range of at least 1 to not greater than 8 or within a range of at least 2 to not greater than 7 or within a range of at least 3 to not greater than 6.

Embodiment 15

The composition of Embodiment 10, wherein the plurality of abrasive particles comprise at least 1 wt % polycrystalline transition alumina for a total weight of the plurality of abrasive particles or at least 2 wt %, or at least 3 wt %, or at least 5 wt %, or at least 7 wt %, or at least 10 wt %, or at least 12 wt %, or at least 15 wt %, or at least 18 wt % or at least 20 wt %.

Embodiment 16

The composition of Embodiment 10, wherein the plurality of abrasive particles comprise not greater than 30 wt % polycrystalline transition alumina for a total weight of the plurality of abrasive particles or not greater than 25 wt %, or not greater than 22 wt %, or not greater than 20 wt %, or not greater than 18 wt %, or not greater than 15 wt %, or not greater than 12 wt % or not greater than 10 wt %.

Embodiment 17

The composition of any one of Embodiments 1 and 2, wherein the plurality of abrasive particles consist essentially of alpha alumina.

Embodiment 18

The composition of any one of Embodiments 1 and 2, wherein the plurality of abrasive particles comprise polycrystalline alpha alumina.

Embodiment 19

The composition of any one of Embodiments 1 and 2, wherein the plurality of abrasive particles comprise at least 60 wt % polycrystalline alpha alumina for a total weight of the plurality of abrasive particles or at least 70 wt %, or at least 80 wt %, or at least 90 wt % or at least 95 wt %.

Embodiment 20

The composition of Embodiment 19, wherein the plurality of abrasive particles comprise not greater than 99 wt % polycrystalline alpha alumina for a total weight of the plurality of abrasive particles or not greater than 97 wt %, or not greater than 95 wt %, or not greater than 90 wt %, or not greater than 88 wt %, or not greater than 85 wt %, or not greater than 83 wt % or not greater than 80 wt %.

Embodiment 21

The composition of Embodiment 2, wherein the median particle size (D50) of the plurality of abrasive particles is at least 5 microns.

Embodiment 22

The composition of any one of Embodiments 1 and 21, wherein the median particle size is at least 6 microns, or at least 7 microns, or at least 8 microns, or at least 9 microns, or at least 10 microns, or at least 15 microns, or at least 20 microns, or at least 25 microns, or at least 30 microns, or at least 35 microns, or at least 40 microns, or at least 45 microns, or at least 50 microns, or at least 55 microns, or at least 60 microns, or at least 80 microns, or at least 100 microns, or at least 200 microns, or at least 300 microns, or at least 400 microns, or at least 500 microns, or at least 800 microns, or at least 1000 microns, or at least 2000 microns, or at least 3000 microns, or at least 4000 microns or at least 5000 microns.

Embodiment 23

The composition of any one of Embodiments 1 and 21, wherein the median particle size is not greater than 6000 microns, or not greater than 5000 microns, or not greater than 4000 microns, or not greater than 3000 microns, or not greater than 2000 microns, or not greater than 1000 microns, or not greater than 800 microns, or not greater than 500 microns, or not greater than 200 microns, or not greater than 100 microns, or not greater than 80 microns, or not greater than 70 microns, or not greater than 60 microns or not greater than 50 microns.

Embodiment 24

The composition of any one of Embodiments 1 and 21, wherein the median particle size is within a range including at least 5 microns and not greater than 200 microns or within a range including at least 6 microns and not greater than 100 microns or within a range including at least 6 microns and not greater than 50 microns.

Embodiment 25

The composition of Embodiment 1, wherein the plurality of abrasive particles have a half 100 percent distribution value (D100-D0)/D50 of not greater than 7.5.

Embodiment 26

The composition of any one of Embodiments 2 and 25, wherein the plurality of abrasive particles have a 100 percent distribution value (D100-D10) of at least 25 microns, or at least 30 microns, or at least 35 microns, or at least 40 microns, or at least 45 microns, or at least 50 microns, or at least 55 microns, or at least 60 microns, or at least 80 microns, or at least 100 microns, or at least 120 microns, or at least 150 microns, or at least 180 microns, or at least 200 microns, or at least 300 microns, or at least 500 microns, or at least 800 microns, or at least 1000 microns, or at least 2000 microns, or at least 3000 microns, or at least 4000 microns or at least 5000 microns.

Embodiment 27

The composition of any one of Embodiments 2 and 25, wherein the plurality of abrasive particles have a 100 percent distribution value (D100-D10) of not greater than 20,000 microns, or not greater than 15,000 microns, or not greater than 10,000 microns, or not greater than 5000 microns, or not greater than 2000 microns, or not greater than 1000 microns, or not greater than 800 microns, or not greater than 500 microns, or not greater than 200 microns, or not greater than 180 microns, or not greater than 150 microns, or not greater than 120 microns, or not greater than 100 microns or not greater than 80 microns.

Embodiment 28

The composition of any one of Embodiments 2 and 25, wherein the plurality of abrasive particles have a 100 percent distribution value (D100-D10) within a range including at least 20 microns and not greater than 1000 microns or within a range including at least 20 microns and not greater than 500 microns or within a range including at least 20 microns and not greater than 200 microns.

Embodiment 29

The composition of any one of Embodiments 1 and 2, wherein the 80 percent distribution value (D90-D10) of the plurality of abrasive particles is at least 8 microns, or at least or at least 9 microns, or at least 10 microns, or at least 15 microns, or at least 20 microns, or at least 25 microns, or at least 30 microns, or at least 35 microns, or at least 40 microns, or at least 45 microns, or at least 50 microns, or at least 55 microns, or at least 60 microns, or at least 80 microns, or at least 100 microns, or at least 200 microns, or at least 300 microns, or at least 400 microns, or at least 500 microns, or at least 800 microns, or at least 1000 microns, or at least 2000 microns, or at least 3000 microns, or at least 4000 microns, or at least 5000 microns, or at least 6000 microns or at least 7000 microns.

Embodiment 30

The composition of any one of Embodiments 1 and 2, wherein the 80 percent distribution value (D90-D10) of the plurality of abrasive particles is not greater than 8000 microns, or not greater than 7000 microns, or not greater than 6000 microns, or not greater than 5000 microns, or not greater than 4000 microns, or not greater than 3000 microns, or not greater than 2000, microns or not greater than 1000 microns, or not greater than 800 microns, or not greater than 500 microns, or not greater than 200 microns, or not greater than 100 microns, or not greater than 80 microns, or not greater than 70 microns, or not greater than 60 microns or not greater than 50 microns.

Embodiment 31

The composition of any one of Embodiments 1 and 2, wherein the plurality of abrasive particles have a 80 percent distribution value (D90-D10) within a range including at least 8 microns and not greater than 800 microns or within a range including at least 8 microns and not greater than 200 microns or within a range including at least 8 microns and not greater than 100 microns.

Embodiment 32

The composition of any one of Embodiments 1 and 2, wherein the plurality of abrasive particles comprise a half 80 percent distribution value ((D90-D10)/D50) of at least 0.00025, or at least 0.0005, or at least 0.001, or at least 0.005, or at least 0.008, or at least 0.01, or at least 0.05, or at least 0.08, or at least 0.1, or at least 0.2, or at least 0.3, or at least 0.5, or at least 0.8, or at least 1 or at least 2.

Embodiment 33

The composition of any one of Embodiments 1 and 2, wherein the plurality of abrasive particles comprise a half 80 percent distribution value ((D90-D10)/D50) of not greater than 2, or not greater than 1, or not greater than 0.5, or not greater than 0.1, or not greater than 0.05, or not greater than 0.01, or not greater than 0.005 or not greater than 0.001.

Embodiment 34

The composition of any one of Embodiments 1 and 2, wherein the plurality of abrasive particles comprise a half 80 percent distribution value ((D90-D10)/D50) within a range including at least 0.0025 and not greater than 2 or within a range including at least 0.1 and not greater than 1.8 or within a range including at least 0.1 and not greater than 1.5.

Embodiment 35

The composition of any one of Embodiments 1 and 25, wherein the plurality of abrasive particles comprise a half 100 percent distribution value ((D100-D0)/D50) of at least 0.001, or at least 0.005, or at least 0.01, or at least 0.05, or at least 0.1, or at least 0.5, or at least 0.8, or at least or at least 1, or at least 2, or at least 4, or at least 6 or at least 7.

Embodiment 36

The composition of any one of Embodiments 1 and 25, wherein the plurality of abrasive particles comprise a half 100 percent distribution value ((D100-D0)/D50) of not greater than not greater than 7, or not greater than 6, or not greater than 5 or not greater than 4.

Embodiment 37

The composition of any one of Embodiments 1 and 25, wherein the plurality of abrasive particles comprise a half 100 percent distribution value ((D100-D0)/D50) within a range including at least 0.001 and not greater than 7.5 or within a range including at least 0.1 and not greater than 7.0 microns or within a range including at least 0.1 and not greater than 5.

Embodiment 38

The composition of any one of Embodiments 1 and 2, wherein the plurality of abrasive particles comprise a mean particle size of at least 5 microns.

Embodiment 39

The composition of any one of Embodiments 1 and 2, wherein the plurality of abrasive particles comprise a mean particle size of not greater than 10, or not greater than 8 microns, or not greater than 7 microns, or not greater than 6 microns.

Embodiment 40

The composition of any one of Embodiments 1 and 2, wherein the plurality of abrasive particles comprise a mean particle size within a range including at least 5 microns and not greater than 10 microns.

Embodiment 41

The composition of any one of Embodiments 1 and 2, wherein the plurality of abrasive particles comprise a skewness of at least 1 or at least 1.5, or at least 2, or at least 2.5 or at least 2.8.

Embodiment 42

The composition of any one of Embodiments 1 and 2, wherein the plurality of abrasive particles comprise a skewness of not greater than 5, or not greater than 4, or not greater than 3, or not greater than 2.9.

Embodiment 43

The composition of any one of Embodiments 1 and 2, wherein the plurality of abrasive particles comprise a skewness within a range of at least 1 to not greater than 5 or within a range of at least 2.3 to not greater than 4 or within a range of at least 2.4 to not greater than 3.5.

Embodiment 44

The composition of any one of Embodiments 1 and 2, wherein the plurality of abrasive particles comprise a kurtosis at least 4.5, or at least 5, or at least 6 or at least 7.

Embodiment 45

The composition of any one of Embodiments 1 and 2, wherein the plurality of abrasive particles comprise a kurtosis of not greater than 10, or not greater than 9, or not greater than 8 or not greater than 7.5.

Embodiment 46

The composition of any one of Embodiments 1 and 2, wherein the plurality of abrasive particles comprise a kurtosis within a range of at least 1 to not greater than 10 or within a range of at least 2 to not greater than 9 or within a range of at least 4.5 to not greater than 8.

Embodiment 47

The composition of Embodiment 1, wherein the plurality of abrasive particles comprise a porosity of at least 30 vol % for a total volume of the plurality of abrasive particles.

Embodiment 48

The composition of any one of Embodiments 2 and 47, wherein the plurality of abrasive particles comprise a porosity of at least 35 vol %, or at least 38 vol %, or at least 40 vol %, or at least 42 vol %, or at least 45 vol %, or at least 47 vol %, or at least 50 vol %, or at least 55 vol %, or at least 60 vol %, or at least 65 vol %, or at least 70 vol %, or at least 75 vol % or at least 80 vol %.

Embodiment 49

The composition of any one of Embodiments 2 and 47, wherein the plurality of abrasive particles comprise a porosity of not greater than 80 vol % for a total volume of the plurality of abrasive particles or not greater than 75 vol %, or not greater than 70 vol %, or not greater than 65 vol %, or not greater than 60 vol %, or not greater than 55 vol %, or not greater than 50 vol %, or not greater than 45 vol %, or not greater than 40 vol %, or not greater than 35 vol % or not greater than 30 vol %.

Embodiment 50

The composition of Embodiment 2, wherein the plurality of abrasive particles comprise mesoporosity having an average meso branching index of at least 55 junctions/microns$^2$.

Embodiment 51

The composition of any one of Embodiments 1 and 50, wherein the average meso branching index is at least 58 junctions/microns$^2$ or at least 60 junctions/microns$^2$.

Embodiment 52

The composition of any one of Embodiments 1 and 50, wherein the average meso branching index is not greater than 150 junctions/microns$^2$, or not greater than 140 junctions/microns$^2$, or not greater than 130 junctions/microns$^2$, or not greater than 120 junctions/microns$^2$, or not greater than 110 junctions/microns$^2$, or not greater than 100 junctions/microns$^2$, or no greater than 90 junctions/microns$^2$, or not greater than 80 junctions/microns$^2$, or not greater than 70 junctions/microns$^2$, or not greater than 65 junctions/microns$^2$, or no greater than 60 junctions/microns$^2$ or not greater than 55 junctions/microns$^2$.

Embodiment 53

The composition of any one of Embodiments 1 and 2, wherein the plurality of abrasive particles have an average pore size of at least 0.001 microns, or at least 0.01 microns, or at least 0.1 microns or least 1 micron.

Embodiment 54

The composition of any one of Embodiments 1 and 2, wherein the plurality of abrasive particles have an average pore size of not greater than 2 microns, or not greater than 1 micron, or not greater than 0.1 microns or not greater than 0.01 microns.

Embodiment 55

The composition of any one of Embodiments 1 and 2, wherein the plurality of abrasive particles comprises an average surface area of at least 1 m$^2$/g, or at least 2 m$^2$/g, or at least 4 m$^2$/g, or at least 6 m$^2$/g, or at least 8 m$^2$/g, or at least 10 m$^2$/g, or at least 12 m$^2$/g, or at least 15 m$^2$/g, or at least 18 m$^2$/g, or at least 20 m$^2$/g, or at least 22 m$^2$/g, or at least 25 m$^2$/g or at least 28 m$^2$/g.

Embodiment 56

The composition of any one of Embodiments 1 and 2, wherein the plurality of abrasive particle comprise an average surface area of not greater than 30 m$^2$/g, or not greater than 28 m$^2$/g, or not greater than 26 m$^2$/g, or not greater than 24 m$^2$/g, or not greater than 22 m$^2$/g, or not greater than 20 m$^2$/g, or not greater than 18 m$^2$/g, or not greater than 16

$m^2/g$, or not greater than 14 $m^2/g$, or not greater than 12 $m^2/g$, or not greater than 10 $m^2/g$ or not greater than 8 $m^2/g$.

Embodiment 57

The composition of any one of Embodiments 1 and 2, further comprising at least one of a surfactant, dispersant, wetting agent, thickener, defoamer, antimicrobial agent, suspension aid, oxidizer, or any combination thereof.

Embodiment 58

The composition of any one of Embodiments 1 and 2, further comprising a liquid carrier, wherein the plurality of abrasive particles are suspended in the liquid carrier to form a polishing slurry.

Embodiment 59

The composition of any one of Embodiments 1 and 2, wherein the plurality of abrasive particles defines a monomodal distribution.

Embodiment 60

A method for conducting a material removal process on a workpiece comprising:
moving a plurality of abrasive particles relative to a workpiece, the plurality of abrasive particles comprising alumina and further comprising at least one of:
a) an average meso branching index of at least 20 junctions/microns$^2$ and a median particle size (D50) of at least 5 microns;
b) a porosity of at least 5 vol % and a half 100 percent distribution value (D100-D0)/D50 of not greater than 7.5; or
c) any combination thereof.

Embodiment 61

The method of Embodiment 60, wherein the plurality of abrasive particles further comprises at least one of:
a) wherein the plurality of abrasive particles include at least 60 wt % and not greater than 95 wt % alumina for a total weight of the plurality of abrasive particles;
b) wherein the plurality of abrasive particles include transition alumina;
c) wherein the plurality of abrasive particle include alpha alumina;
d) wherein the plurality of abrasive particles comprise an alumina phase content ratio (Cp) of at least 0.1 and not greater than 10 as defined by the equation Cp=Ca/Ct, wherein Ca represents the content (vol %) of alpha alumina in the plurality of abrasive particles and Ct represents the content (vol %) of transition phase alumina in the plurality of abrasive particles;
e) wherein the plurality of abrasive particles comprise a porosity within a range of at least 30 vol % to not greater than 50 vol % for a total volume of the plurality of abrasive particles;
f) wherein the plurality of abrasive particles comprise mesoporosity having an average meso branching index within a range of at least 55 junctions/microns$^2$ to not greater than 150 junctions/microns$^2$;
g) wherein the plurality of abrasive particles have an average pore size within a range of at least 0.001 microns to not greater than 2 microns;
h) wherein the plurality of abrasive particles comprises a surface area within a range of at least 1 $m^2/g$ to not greater than 20 $m^2/g$;
i) or any combination thereof.

Embodiment 62

The method of any one of Embodiments 60 and 61, wherein the plurality of abrasive particles further comprises at least one of:
a) wherein the median particle size is within a range of at least 5 microns and not greater than 6000 microns;
b) wherein the plurality of abrasive particles have a 100 percent distribution value (D100-D10) within a range of at least 8 microns to not greater than 20,000 microns;
c) wherein the 80 percent distribution (D90-D10) of the plurality of abrasive particles is within a range of at least 7 microns to not greater than 8000 microns;
d) wherein the plurality of abrasive particles comprise a half 80 percent distribution value ((D90-D10)/D50) within a range of at least 0.00025 to not greater than 1500;
e) wherein the plurality of abrasive particles comprise a half 100 distribution value ((D100-D0)/D50) within a range of at least 0.001 to not greater than 7;
f) wherein the plurality of abrasive particles comprise a mean particle size within a range of at least 5 microns to not greater than 6000 microns;
g) wherein the plurality of abrasive particles comprise a skewness within a range of at least 2.3 to not greater than 10;
h) wherein the plurality of abrasive particles comprise a kurtosis within a range of at least 4.5 to not greater than 20;
i) wherein the plurality of abrasive particles defines a monomodal distribution;
j) or any combination thereof.

Embodiment 63

The method of Embodiment 60, wherein the plurality of abrasive particles are suspended in a liquid carrier.

Embodiment 64

The method of Embodiment 60, wherein the plurality of abrasive particles are part of a polishing composition.

Embodiment 65

The method of Embodiment 64, wherein the polishing composition includes at least one of a surfactant, dispersant, wetting agent, thickener, defoamer, antimicrobial agent, suspension aid, or any combination thereof.

Embodiment 66

The composition of Embodiments 1 or 2, wherein a particle size distribution of the plurality of abrasive particles has a variance of at least 3.0, or at least 4.0, or at least 4.5 or at least 5.0.

Embodiment 67

The composition of Embodiments 1 or 2, wherein a particle size distribution of the plurality of abrasive particles has a variance of not greater than 20 or not greater than 15 or not greater than 10 or not greater than 8, or not greater than 7 or not greater than 6.

EXAMPLES

Example 1

A starting material was prepared by calcining a boehmite material until a full conversion to alpha alumina was reached. The alpha alumina particles of the starting material had a particle characteristic as summarized in Table 1.

TABLE 1

|  | Starting Material | Sample S1 |
|---|---|---|
| D50 [μm] | 4.95 | 5.80 |
| (D100 − D0)/D50 | 7.91 | 3.91 |
| (D90 − D10)/D50 | 2.15 | 1.26 |
| Mean [μm] | 5.89 | 6.23 |
| Variance | 23.94 | 5.06 |
| Alpha alumina content [%] | 100 | 100 |
| Skewness | 2.24 | 2.86 |
| Kurtosis | 4.21 | 7.26 |
| Meso Branching Index [junctions/microns$^2$] | 51 | 63 |
| SSA [m$^2$/g] | 10.95 | 8.81 |
| Density [g/cm$^3$] | 3.96 | 3.97 |
| Porosity [%] | 43 | 47 |

The alpha alumina particles of the starting material were subjected to a sieving process to narrow the particle distribution (Sample S1). A summary of the obtained narrower particles of Sample S1 is also shown in Table 1.

The abrasive particles of Sample 1 demonstrated mesoporosity and had a meso branching index of approximately 63 junctions/microns$^2$. The average pore size was approximately 0.6 microns and the porosity of the abrasive particles was approximately 47 vol % for a total volume of the abrasive particles.

Example 2

Testing and Comparing of Polishing Performance.

A slurry (S1) was prepared including 17 wt % of the abrasive particulate of Sample 1 of Example 1. The slurry further included 43 wt % water, 11 wt % mineral spirit, 10.5 wt % Nynas T-4 shining oil, 15 wt % Acti-gel 208 from Active Minerals, and about 4 wt % emulsifiers.

A comparative slurry (C1) was prepared with the same base composition contained in S1, and by replacing the 17 wt % abrasive particles of Sample 1 with 17 wt % of the abrasive material used as starting material in Example 1.

The polishing efficiencies of slurries S1 and C1 was compared by conducting standardized cut-rate tests on ACT automotive test panels (ACT product number 61508).

These panels were sanded with 1500 grit sand-paper until a surface finish of 2000-3000 Å was achieved. Thereafter, the panels were cut into 4×4 inches sections.

For the testing, a 4×4 inches test panel was mounted onto the application test and held magnetically in position. A stationary polishing arm with a 3" Dynabrade Dynabuffer model: 57126 was attached to perform controlled polishing experiments. A Norton 3 3¼" Nor-grip Orange Foam Buffing Pad was attached to the polisher and 8.5 grams of slurry was applied to the surface of the Nor-grip pad. The Polisher was then applied to the test panel using 3.5 lbs of weight, and running at 10,000 rpm for 10 s. After the polishing, the test panel was cleaned using water and dried using compressed air. The panels were finally cleaned using isopropyl alcohol. The cut-rate was determined measuring and calculating the change in mass of the panel before and after polishing. Each test was repeated six times and an average value calculated.

For the calculation of the material removal rate, the change in mass of the panel before and after polishing was divided by the time spent for polishing. The weight of the panels was measured using a benchtop scale.

The gloss and haze of the polished panels were measured using a Micro-Haze Plus Gloss Meter made by BYK-Gardner GmbH. The Gloss-Haze measurements were conducted by moving the gloss haze meter vertically across the polished surface. Gloss/Have measurements were made every 0.25 inches across the polished section. The top 5 measurements on the panel were used for calculating an average gloss value.

The results polishing results are summarized in Table 2. It can be seen that the slurry S1 had an about 40% higher cut rate than comparative slurry C1. In addition, slurry S1 achieved a high gloss value of 66.65, which was about 10% higher than the gloss obtained with comparative slurry C1.

TABLE 2

|  | Cut Rate [μm/hour] | Gloss |
|---|---|---|
| S1 | 7.27 | 66.65 |
| C1 | 5.57 | 60.52 |

The above-disclosed subject matter is to be considered illustrative, and not restrictive, and the appended claims are intended to cover all such modifications, enhancements, and other, embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A composition comprising:
    a plurality of abrasive particles comprising alumina, wherein the plurality of abrasive particles comprise mesoporosity having an average meso branching index of at least 55 junctions/microns$^2$ and a median particle size (D50) of at least 5 microns;
    and wherein a particles size distribution of the plurality of abrasive particles has a variance of at least 3.0 and not greater than 20; and
    the plurality of abrasive particles comprise a skewness of at least 2.5.

2. The composition of claim 1, wherein the plurality of abrasive particles further comprise a half 100 percent distribution value (D100-D0)/D50 of not greater than 7.5.

3. The composition of claim 1, wherein the variance is at least 3.0 and not greater than 8.

4. The composition of claim 1, wherein the plurality of abrasive particles comprise alpha alumina.

5. The composition of claim 4, wherein the plurality of abrasive particles consist essentially of alpha alumina.

6. The composition of claim 1, wherein the plurality of abrasive particles comprise a porosity of at least 5 vol %.

7. The composition of claim 6, wherein the plurality of abrasive particles has the porosity of at least 30 vol % and not greater than 55 vol %.

8. The composition of claim 1, wherein the plurality of abrasive particles comprise an average surface area of at least 4 m$^2$/g and not greater than 20 m$^2$/g.

9. The composition of claim 1, wherein the plurality of abrasive particles have an average particle size not greater than 20 microns.

10. The composition of claim 1, wherein the composition is a polishing slurry comprising a liquid carrier and the plurality of particles of claim 1.

11. The composition of claim 1, wherein the plurality of abrasive particles define a monomodal particle size distribution.

12. A composition comprising: a plurality of abrasive particles comprising alumina, wherein the plurality of abrasive particles comprise
   a porosity of at least 5 vol %;
   a median particle size (D50) of at least 5 microns;
   a half 100 percent distribution value (D100-D0)/D50 of not greater than 7.5;
   a skewness of at least 2.5; and
   a material of the plurality of abrasive particles comprises at least 90 wt % alpha alumina.

13. The composition of claim 12, wherein the abrasive particles consist essentially of alpha alumina.

14. The composition of claim 13, wherein the plurality of abrasive particles comprise mesoporosity having an average meso branching index is at least 55 junctions/microns$^2$.

15. A method for conducting a material removal process on a workpiece comprising:
   moving a plurality of abrasive particles relative to a workpiece, the plurality of abrasive particles comprising alumina comprising:
   an average meso branching index of at least 55 junctions/microns$^2$ and a median particle size (D50) of at least 5 microns;
   a porosity of at least 5 vol % and a half 100 percent distribution value (D100-D0)/D50 of not greater than 7.5;
   a particles size distribution has a variance of at least 3.0 and not greater than 20; and a skewness of at least 2.5.

16. The method of claim 15, wherein the plurality of particles are a part of a polishing composition.

* * * * *

UNITED STATES PATENT AND TRADEMARK OFFICE
CERTIFICATE OF CORRECTION

| | | |
|---|---|---|
| PATENT NO. | : 11,674,065 B2 | Page 1 of 1 |
| APPLICATION NO. | : 16/537264 | |
| DATED | : June 13, 2023 | |
| INVENTOR(S) | : Stephen Bottiglieri et al. | |

It is certified that error appears in the above-identified patent and that said Letters Patent is hereby corrected as shown below:

In the Claims

Column 28, Line 8, please delete "The composition of claim 13, wherein" and insert -- The composition of claim 12, wherein --

Signed and Sealed this
Twenty-fourth Day of September, 2024

Katherine Kelly Vidal
*Director of the United States Patent and Trademark Office*